United States Patent
Carter et al.

[15] 3,704,953
[45] Dec. 5, 1972

[54] AUTOMATIC RADIANT ENERGY ANALYZER WITH PROGRAMMED SAMPLE SELECTION AND ANALYSIS

[72] Inventors: Dale K. Carter, Arcadia; Carel H. Ronkes, Garden Grove, both of Calif.

[73] Assignee: Beckman Instruments, Inc., Fullerton, Calif.

[22] Filed: Dec. 7, 1970

[21] Appl. No.: 95,493

[52] U.S. Cl. .................. 356/96, 23/252 R, 250/226, 356/100, 356/244
[51] Int. Cl. ......... G01j 3/42, G01j 3/12, G01n 21/16
[58] Field of Search .......... 250/106 SC, 43.5 R, 226; 356/74, 101, 244, 246; 23/252 R, 255

[56] References Cited

UNITED STATES PATENTS

| | | | |
|---|---|---|---|
| 3,571,596 | 3/1971 | Frank | 250/106 SC |
| 3,563,656 | 2/1971 | Helms | 256/100 |
| 3,523,737 | 8/1970 | Wood et al. | 356/180 |
| 3,486,822 | 12/1969 | Harris | 356/83 |
| 3,193,684 | 7/1965 | Kingston | 250/106 SC |

*Primary Examiner*—Ronald L. Wibert
*Assistant Examiner*—V. P. McGraw
*Attorney*—Paul R. Harder and Robert J. Steinmeyer

[57] ABSTRACT

A radiant energy analyzer is connected to a sample changer for selecting and positioning samples automatically in the analyzer for analysis according to sample selection programs. A wavelength programmer is attached to the analyzer to select a sequence of wavelength scanning intervals by which the samples are analyzed. A code sensing device is connected to the wavelength programmer for sensing an arrangement of coding elements associated with each sample location to select a wavelength scanning program.

8 Claims, 3 Drawing Figures

INVENTORS
DALE K. CARTER
CAREL H. RONKES
BY *Paul R. Harder*
ATTORNEY

INVENTORS
DALE K. CARTER
CAREL H. RONKES

BY *Paul R Harder*
ATTORNEY

AUTOMATIC RADIANT ENERGY ANALYZER WITH PROGRAMMED SAMPLE SELECTION AND ANALYSIS

The present invention relates to automatic radiant energy analyzers and more particularly to an automated spectrophotometer for automatic selection and analysis of a multiplicity of samples.

In the field of spectrophotometers, it has been the general practice to employ manual methods to insert and remove samples for analysis in the spectrophotometer. In addition, mechanical mechanisms have been used to obtain the wavelength scanning function of the spectrophotometer and the mechanism must be manually changed in order to obtain a different scanning function. Although such manual techniques and methods have served the purpose, they have not proved entirely satisfactory under all conditions of service for the reason that considerable difficulty has been experienced in handling a multiplicity of samples which must be analyzed over a variety of different wavelength scanning regions. In addition, considerable difficulty has been encountered in occupying trained personnel for such activities who could be used more productively elsewhere. Those concerned with the development of spectrophotometers have long recognized the need for automatic sample handling and analysis. The present invention fulfills this need.

The general purpose of this invention is to provide a spectrophotometer which embraces all the advantages of similarly employed manually operated analyzers and possesses none of the aforedescribed disadvantages. To attain this, the present invention contemplates a unique combination of programmed automatic sample handling and wavelength selection apparatus whereby the need for highly skilled and trained personnel is avoided.

An object of the present invention is the automatic analysis of a multiplicity of samples by a radiant energy analyzer according to a sample selection program and an analysis program of radiant energy wavelength to which each sample is subjected.

Another object is to automatically analyze a multiplicity of samples in a spectrophotometer by automatically positioning each sample in the spectrophotometer for analysis and analyzing each sample according to an automatically selected program of wavelength scanning.

A further object of the invention is the provision of automatic solid sample selection and automatically programmed wavelength interval scanning in combination with the analytical function of a spectrophotometer.

Still another object is to provide automatic liquid sample selection and an automatically programmed wavelength interval scanning in combination with the analytical functions of a spectrophotometer.

Yet another object of the present invention is the provision of coding elements attached to each solid sample holder for selecting a wavelength interval scanning program by which the sample is to be analyzed.

A still further object is to provide coding elements attached to a sample holding tray adjacent to each liquid sample holder for selecting a wavelength interval scanning program by which each sample is analyzed.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
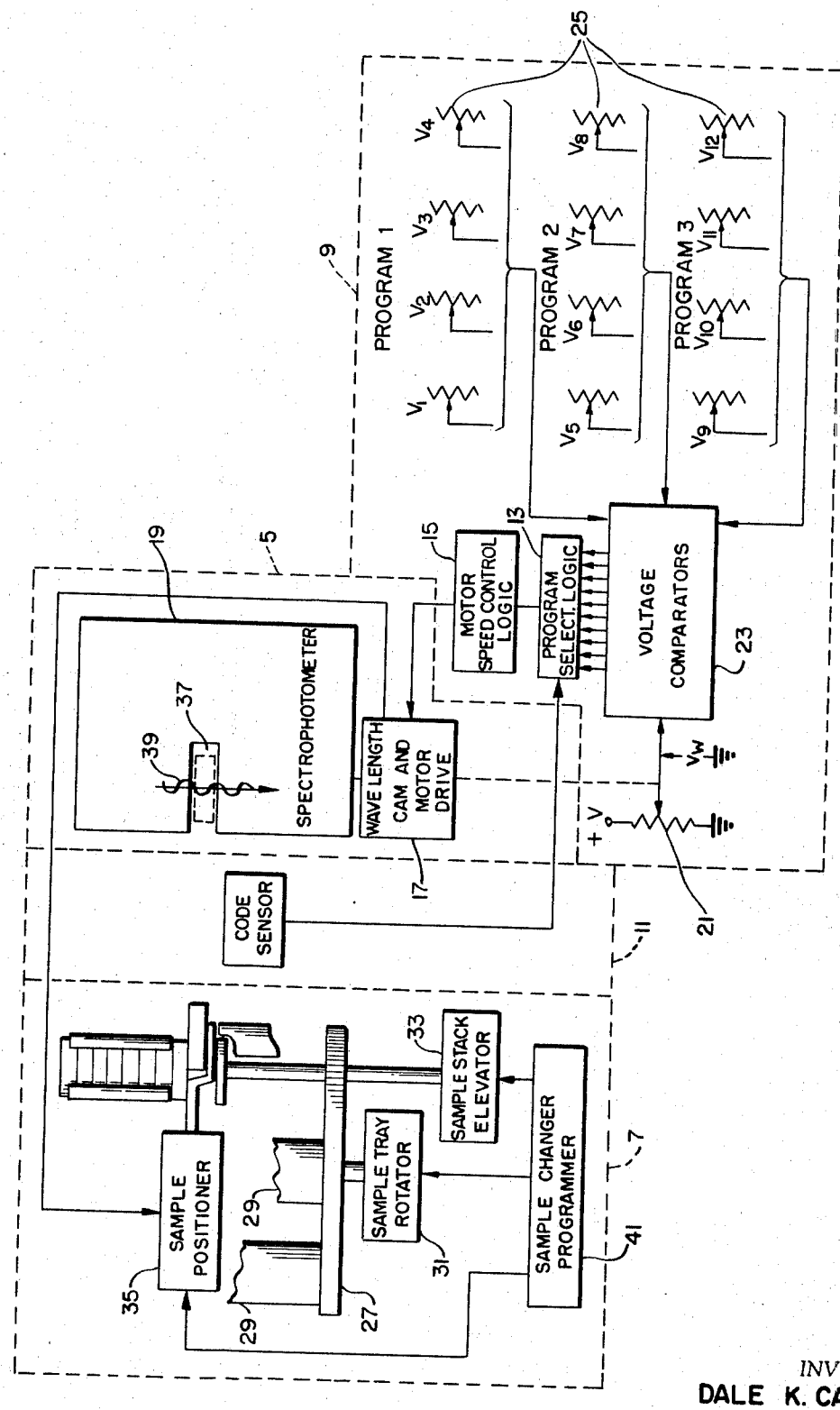
FIG. 1 is a combination of a block, pictorial and schematic diagram of a preferred embodiment of the invention.

Turning now to FIG. 1, there is illustrated a radiant energy analyzer 5, an automatic sample changer 7, a wavelength programmer 9 and a control signal generator or code sensor 11 connected together to form an automatic analytical system for analyzing a plurality of samples according to selected programs. Code sensor 11 is connected to program selection logic 13 which in turn is connected to motor speed control logic 15 which is in turn connected to wavelength cam and motor drive 17. Spectrophotometer 19 has its wavelength scanning controlled by wavelength cam and motor drive 17 to which is mechanically attached wavelength potentiometer 21. The variable tap of potentiometer 21 is connected to voltage comparators 23 which in turn are connected to the variable taps of a multiplicity of potentiometers 25 arranged in a plurality of program groups. The outputs of the voltage comparators 23 are connected to program selection logic 13. Voltage comparators 23 may consist of a plurality of open-loop operational amplifiers well known in the field of electronic voltage comparison.

A rotating sample tray 27 contains stacks of samples 29, the tray 27 being rotated by sample tray rotator 31. Sample stack elevator 33 elevates a sample stack into a location where sample positioner 35 can remove a sample holder from the stack and position the sample into sample path 37 of spectrophotometer 13 where radiant energy beam 39 can be passed through the sample. Sample changer programmer 41, which may contain relays, switches and timers in combinations well known in the field of electronic control, controls the operation of sample positioner 35, sample tray rotator 31 and sample stack elevator 33 for selection of a particular sequence of samples for analysis.

Figure 2:
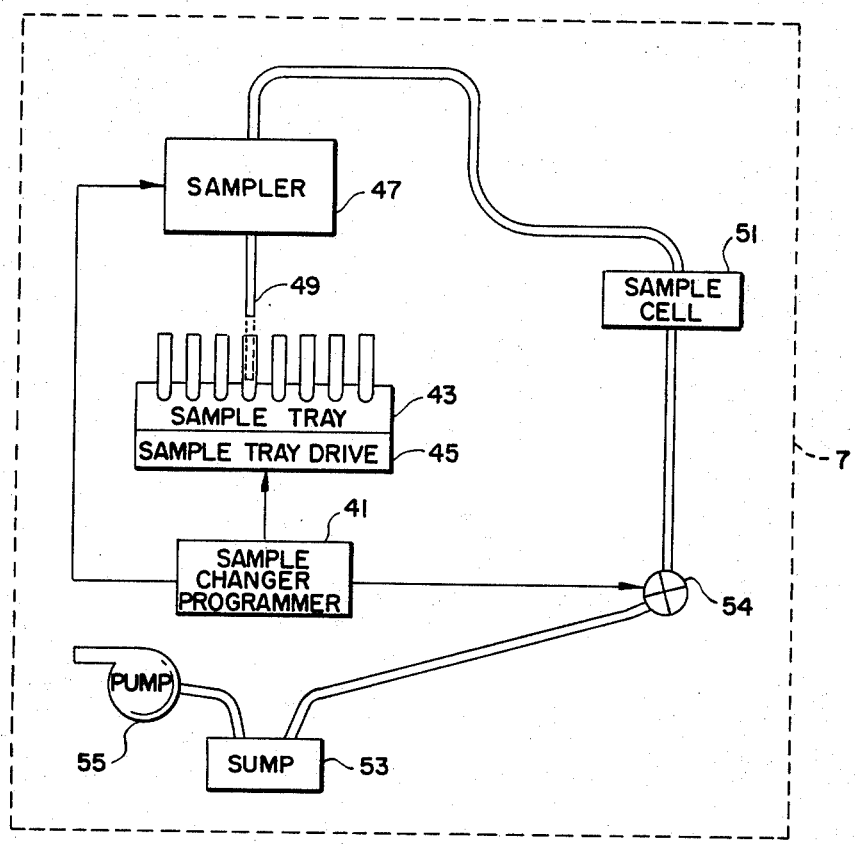
FIG. 2 illustrates a combination of a block and pictorial diagram of an automatic liquid sample handling system.

Referring now to FIG. 2, there is illustrated an alternate sample changer 7 for handling liquid samples. Sample tray 43 holds a multiplicity of liquid sample holders which are driven by sample tray drive 45 to a position where sampler 47 can lower tube 49 into each liquid sample holder as illustrated by the dotted line. Sample changer programmer 41 controls sampler 47 and sample tray drive 45 to select a particular sequence of samples according to a given program. Sample tray 43 and sample tray drive 45 may consist of a plurality of small trays which are moved about by motor driven fingers or belts. The contents of each sample holder are passed through sample cell 51 located in the sample path of the spectrophotometer and then discharged into sump 53. Pump 55 creates a vacuum on sump 53 by which liquids from each sample holder are forced into the sample cell and then held for analysis by valve 54 which is controlled by programmer 41. Although the embodiment as described and illustrated in FIG. 2 moves the sample tray 43 relative to the sampler 47, the present invention also contemplates moving the sampler relative to the sample tray or moving both sampler and sample tray in combination to position selected sample holders for analysis.

FIGS. 3(a) and 3(b) illustrate the methods of coding for wavelength program selection which may be used in conjunction with code sensor 11. FIG. 3(a) shows a solid sample holder 57 on which are located concentric bands of light and dark colors representing a code for a particular wavelength program. An outer band 59 is shown dark and an adjacent inner band 61 is light. Center 63 is left clear for transmission of radiant energy beam 39. Code sensor 11, which may contain lamp and photocell combinations for each band, as illustrated for band 61, determines the presence of light or dark bands and their sequence to sense a particular program code. FIG. 3(b) illustrates a liquid sample holder and a coding dot arrangement consisting of dark colored dot 65 and light colored dot 67 located on sample tray 43 adjacent to the liquid sample holder. Lamp and photocell combinations can be used to sense the dot code combination similar to that illustrated in FIG. 3(a).

Figure 3:
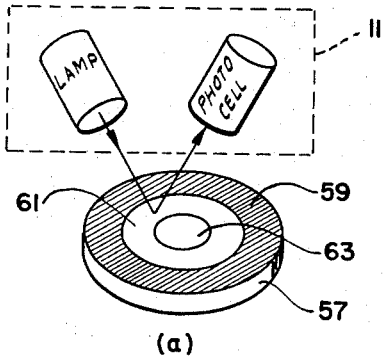
FIGS. 3($a$) and 3($b$) are pictorial diagrams illustrating the coding elements for solid and liquid sample holders.
Figure 3:
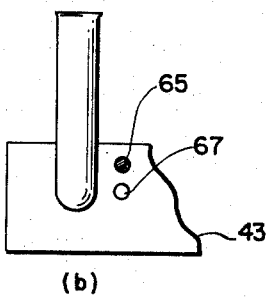

The operation of the automatic analytical system can best be described by reference to FIG. 1. Wavelength cam and motor drive 17, controls the wavelength of radiant energy beam 39 in sample path 37 of spectrophotometer 19 by techniques well known in the field of spectrophotometry. The motor drive is controlled by motor speed control logic 15 such that the motor speed is slow in wavelength intervals of scanning interest and fast in those wavelength intervals having no analytical interest. The speed is selected according to code sensor 11 by program selection logic 13, which may consist of a combination of diode AND gates well known in the field of electronic logic. Code sensor 11 generates a control signal in response to codes associated with each sample holder as illustrated in FIG. 3. The program selection logic 13 receives outputs from voltage comparators 23 which indicate when voltage $V_w$ at the variable tap of wavelength potentiometer 21 equals each of a multiplicity of voltages at the variable taps of potentiometers 25. Potentiometers 25 are adjusted according to various program groupings to provide a particular sequence of points in the wavelength scan where the motor speed is to be changed. Code sensor 11 selects those voltage comparator outputs which are associated with the desired program of potentiometers 25. Therefore, a particular sample which is to be analyzed is sensed by the code sensor 11 to select a particular program of fast and slow wavelength interval scanning by which the sample is to be analyzed. Upon completion of the wavelength scan, the sample changer is initiated to introduce a new sample for analysis.

Each of the stacks of solid sample holders 29 on sample tray 27 are rotated by sample tray rotator 31 into a position over the sample stack elevator 33. Sample changer programmer 41 directs sample tray rotator 31 as to which stack is to be positioned over the sample stack elevator 33. Once positioned, sample changer programmer 41 instructs sample stack elevator 33 to raise the selected stack into a position adjacent sample positioner 35. Sample changer programmer then commands sample positioner 35 to sequentially push the bottom most sample out of the stack and into the sample path 37 of spectrophotometer 19 where radiant energy beam 39 can pass through the sample for analysis. The sample positioner 35 then returns the sample from sample path 37 back into the stack where the sample stack elevator lowers the sample stack one sample position and sample positioner 35 repeats its positioning process on the next sample. The above process is repeated until all the samples in a given stack have been analyzed.

The solid sample changer illustrated in FIG. 1 can be replaced by the liquid sample changer as set forth in FIG. 2. Sample changer programmer 41 positions each of a multiplicity of liquid sample holders held in sample tray 43 under the sampling tube 49 of sampler 47 according to a preselected program. When tube 49 is lowered into a particular liquid sample holder as instructed by programmer 41, the liquid contents of the sample holder are then forced through sampler 47 and sample cell 51 where the liquid is held for analysis. The liquid is then collected in sump 53.

It now should be apparent that the present invention provides a circuit arrangement which may be employed in conjunction with a spectrophotometer analyzer for automatically handling and analyzing a plurality of samples according to sample selection and wavelength selection programs.

Although particular components, etc., have been discussed in connection with a specific embodiment of an analyzer constructed in accordance with the teachings of the present invention, others may be utilized. Furthermore, it will be understood that although an exemplary embodiment of the present invention has been disclosed and discussed, other applications and apparatus arrangements are possible and that the embodiments disclosed may be subjected to various changes, modifications and substitutions without necessarily departing from the spirit of the invention.

What is claimed is:

1. An analytical system for automatically analyzing a plurality of samples according to selected programs, comprising:

radiant energy analyzer means having a sample path traversed by a radiant energy beam of selected intervals of wavelength thereby analyzing samples positioned in said path, said analyzer means being a spectrophotometer having a wavelength determining mechanism and a mechanism driving motor whereby the radiant energy beam wavelength is scanned;

sample changer means adjacent said analyzer means for selecting and positioning samples in said path, said changer means having a sample changer programmer and a plurality of sample storage locations from which samples are selected according to said sample changer programmer;

wavelength programmer means connected to said analyzer and said sample changer means for determining a sequence of said selected intervals of wavelength, said programmer means having a multiplicity of wavelength interval determining programs and a program selection logic circuit responsive to control signals applied to said programmer for selecting said wavelength interval programs, said wavelength programmer means comprising a wavelength potentiometer having the variable tap thereof mechanically coupled to said wavelength determining mechanism and having a voltage potential at said variable tap which is a function of wavelength, a multiplicity of potentiometers arranged in a plurality of groups, each group forming a wavelength interval program, each potentiometer having an adjustable voltage potential equivalent to one boundary wavelength of one wavelength interval, and a voltage comparator circuit connected between said wavelength potentiometer and said multiplicity of potentiometers for comparing each adjustable voltage potential of said group with the voltage potential of said wavelength potentiometer and having an output connected to said program selection logic circuits for indicating when the potentials are equal; and a motor speed control logic circuit connected between said program selection logic circuit and said wavelength mechanism driving motor to change the motor speed when the wavelength passes through each selected boundary wavelength thereby changing the wavelength scanning speed.

2. The analytical system of claim 1 wherein said control signal generating means comprises:
code means associated with each sample location for registering and storing a code corresponding to desired wavelength interval program; and
code sensing means for reading said code means and for generating said control signal to select said wavelength interval program.

3. The analytical system of claim 2 wherein said sample changer means is a solid sample changer having a multiplicity of solid sample holders which are selected according to said sample changer programmer comprising:
a sample tray for storing a multiplicity of stacked solid sample holders;
a sample tray rotator connected to said tray and controlled by said sample changer programmer for rotating said stacked solid samples into a position in preparation for analysis;
a sample stack elevator controlled by said sample changer programmer for raising a stack of samples into a sampling position; and,
a sample positioner controlled by said sample changer programmer for removing a sample holder from the raised stack of samples and for positioning said sample holder into said sample path.

4. The analytical system of claim 2 wherein said sample changer means is a liquid sample changer having a multiplicity of liquid sample holders, comprising:
a sample tray for storing a multiplicity of liquid sample holders;
a sampler device adjacent said sample tray for removing the contents of each selected sample holder according to said sample changer programmer;
a sample cell located in said sample path and connected to said sampler device for receiving the contents removed from each selected sample holder by said sampler device; and,
a pump for pumping contents of a liquid sample holder through said sampler and said sample cell for analysis by said analyzer.

5. The analytical system of claim 3 wherein said control signal generating means includes a multiplicity of coding elements fastened in a specific location on each solid sample holder and sensed by said code sensing means to select said wavelength interval determining program.

6. The analytical system of claim 4 wherein said control signal generating means includes code elements fastened to said sample tray adjacent to each of said liquid sample holders and sensed by said code sensing means to select said wavelength interval determining program.

7. The analytical system of claim 5 wherein said code sensing means is a plurality of photocells and lamps whereby the code elements are illuminated and the reflection therefrom is sensed.

8. The analytical system of claim 6 wherein said code sensing means is a plurality of photocells and lamps whereby the code elements are illuminated and reflection therefrom is sensed.

* * * * *